(12) United States Patent
Tanaka (10) Patent No.: US 8,120,925 B2
(45) Date of Patent: Feb. 21, 2012

(54) CIRCUIT DEVICE

(75) Inventor: Takehito Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 12/407,867

(22) Filed: Mar. 20, 2009

(65) Prior Publication Data

US 2009/0244857 A1    Oct. 1, 2009

(30) Foreign Application Priority Data

Mar. 28, 2008   (JP) ................. 2008-087090

(51) Int. Cl.
*H05K 3/00* (2006.01)
(52) U.S. Cl. ........ 361/765; 361/748; 361/782; 257/778; 257/692; 257/775
(58) Field of Classification Search ............... 361/748, 361/782; 257/778, 692, 775
See application file for complete search history.

(56) References Cited

U.S. PATENT DOCUMENTS

| 3,517,279 | A | * | 6/1970 | Ikeda et al. ............... 257/778 |
| 5,023,753 | A | * | 6/1991 | Abe ........................ 361/782 |
| 5,838,070 | A | | 11/1998 | Naruse et al. |
| 6,104,258 | A | * | 8/2000 | Novak ....................... 333/22 R |
| 2007/0003180 | A1 | | 1/2007 | Tanaka et al. |

FOREIGN PATENT DOCUMENTS

| JP | 62-054490 | 3/1987 |
| JP | 9-237962 | 9/1997 |
| JP | 2007-10942 | 1/2007 |
| JP | 2007-49213 | 2/2007 |
| JP | 2008-72701 | 3/2008 |

OTHER PUBLICATIONS

English translation of Office Action mailed Nov. 29, 2011, in corresponding Japanese application 2008-087090.

* cited by examiner

*Primary Examiner* — Tuan T Dinh
*Assistant Examiner* — Hung Dang
(74) *Attorney, Agent, or Firm* — Staas & Halsey LLP (57) ABSTRACT

A circuit device includes a dielectric substrate including a first face and a second face opposite side of the first face; a coplanar line including a first line, a second line and ground electrodes, the first line and the second line being decupled mutually, the ground electrodes formed around the first line and the second line, the first line, the second line and the ground electrodes formed on the first face of the dielectric substrate; a capacitor for connecting the first line and the second line; a termination resistor connecting the second line; a microstrip line formed on the second face of the dielectric substrate; and a conducting portion formed in the dielectric substrate and electrically connecting the first line and the microstrip line.

12 Claims, 5 Drawing Sheets

CIRCUIT DEVICE

CROSS-REFERENCE TO RELATED APPLICATIONS

This application is based upon and claims the benefit of priority of the prior Japanese Patent Application No. 2008-087090, filed on Mar. 28, 2008, the entire contents of which are incorporated herein by reference.

FIELD

The embodiments discussed herein are related to a circuit device.

BACKGROUND

For example, a Mach-Zehnder optical modulator used in a high-speed long-distance optical communication system employs a bias tee. The bias tee is used for applying a DC (direct current) voltage (offset voltage) to a high-frequency RF (radio frequency) signal line, and is usually housed in an housing as a bias tee circuit device together with an optical modulation device.

An example of the optical modulation device includes a Mach-Zehnder optical waveguide and progressive wave electrodes (coplanar electrical waveguide: CPW) for controlling the relative phase of light that propagates through each of the Mach-Zehnder arms, formed on a substrate having an electro-optical effect. In this optical modulation device, a modulation signal voltage applied to the progressive wave electrodes controls the index of refraction of each arm and changes the difference in length of the light paths between the two arms, thereby realizing optical modulation.

Here, obtaining an appropriate optical modulation signal by use of this optical modulation device requires application of an RF modulation signal having an appropriate voltage and a DC bias voltage (operation point control) appropriate for controlling the relative phase shift between the two arms to the MZ arm section. In other words, it is necessary to apply a high-frequency RF signal, which is a modulation signal, and also a superimposed DC voltage to the CPW electrodes formed in the modulator. The bias tee circuit element is used for applying a high-frequency RF signal, which is a modulation signal, and also a superimposed DC voltage to the CPW electrodes as described above.

A documented example of the known art related to the present invention is described in Japanese Laid-open Patent Publication No. 2007-010942.

SUMMARY

According to an aspect of the invention, a circuit device includes a dielectric substrate including a first face and a second face opposite side of the first face; a coplanar line including a first line, a second line and ground electrodes, the first line and the second line being decupled mutually, the ground electrodes formed around the first line and the second line, the first line, the second line and the ground electrodes formed on the first face of the dielectric substrate; a capacitor for connecting the first line and the second line; a termination resistor connecting the second line; a microstrip line formed on the second face of the dielectric substrate; and a conducting portion formed in the dielectric substrate and electrically connecting the first line and the microstrip line.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Embodiments will be described below with reference to the drawings. The embodiment described below is only an example and is not intended to exclude any possible modifications or application of the technology which are not explicitly described below. In other words, various modifications of the embodiment are possible within the spirit and scope of the invention.

[a] First Embodiment

Figure 1:
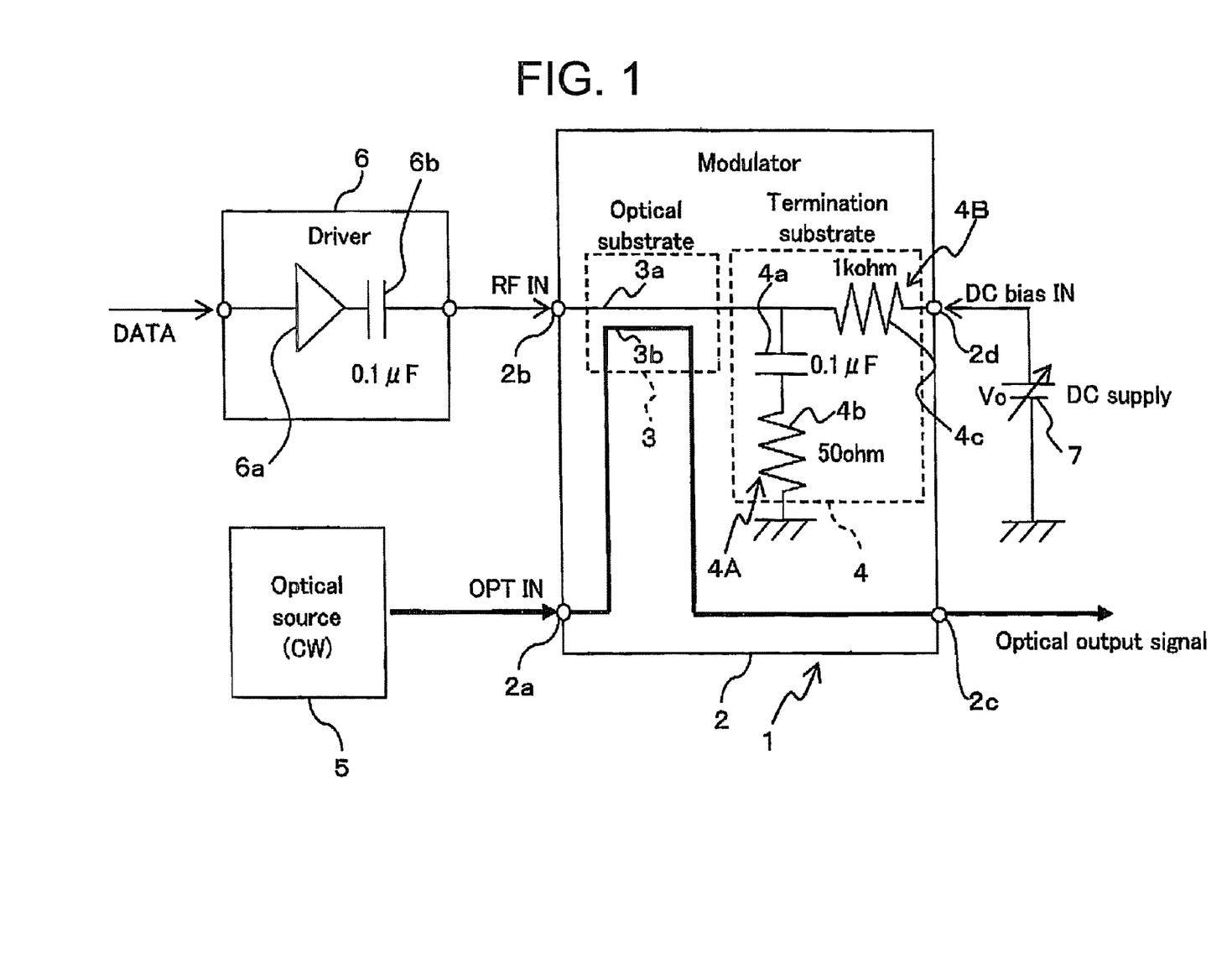
FIG. 1 illustrates an optical modulation system according to an embodiment.

FIG. 1 illustrates an optical modulation system according to an embodiment. Referring to FIG. 1, an optical modulation apparatus 1, which constitutes a circuit device apparatus, is provided with a housing 2 and includes an optical circuit device 3 and an electrical circuit device 4 housed in the housing 2. The optical circuit device 3 inputs light from a light source 5 (such as a CW light source) through a light input terminal 2a and an RF electrical signal through an RF input terminal 2b, and modulates the input light in accordance with this electrical signal.

In other words, an RF electrical signal which has been input through the RF input terminal 2b is made to propagate through an electrical waveguide 3a and light which has been input through the light input terminal 2a is made to propagate through an optical waveguide 3b. The light propagating through the light waveguide 3b is modulated by mutual interaction, caused by an electro-optical effect, with the electrical signal propagating through the electrical waveguide 3a. The optically modulated light is sent out as a light signal to an optical transmission line and the like (not illustrated) through a light output terminal 2c.

An electrical circuit device (circuit device) 4 terminates an electrical signal which has been received by the optical circuit device 3 through the RF input terminal 2b and provides the optical circuit device 3 with a bias signal which has been received through a DC input terminal 2d. In other words, the electrical circuit device 4 functions as a bias tee circuit.

An equivalent circuit of the electrical circuit device 4 is illustrated in FIG. 1. In the electrical circuit device 4, as illustrated in FIG. 1, the RF electrical signal which has propagated through the electrical waveguide 3a is terminated by a capacitor 4a and a grounded termination resistor 4b. A bias signal from the DC input terminal 2d is provided to the electrical waveguide 3a via a resistor 4c.

The termination resistor 4b has an impedance which matches the impedance of the electrical waveguide 3a. In the embodiment in FIG. 1, when the electrical waveguide 3a has an impedance of about 50 ohms, the termination resistor 4b has an impedance of about 50 ohms which matches that of the electrical waveguide 3a.

The capacitor 4a together with the termination resistor 4b make up an RF termination line 4A. The capacitor 4a makes the RF termination line 4A appear to be an open circuit from the view point of a bias signal from the DC input terminal 2d, while functioning as a short circuit for an RF electrical signal, and prevents a bias signal from flowing into the termination resistor 4b. In the present embodiment, a capacitance of about 0.1 μF, for example, is selected to provide favorable termination characteristics for an RF electrical signal having frequencies above or equal to approximately 30 kHz.

A resistor 4c makes up a bias signal line 4B. The resistor 4c has an impedance (about 1 k ohms versus the termination resistor 4b of 50 ohms in the example of FIG. 1) which is sufficiently larger than the termination resistor 4b so that the DC signal line 4B appears to be an open circuit from the viewpoint of an RF electrical signal provided from the electrical waveguide 3a.

Reference numeral 6 of FIG. 1 denotes a driver which outputs an electrical signal for the optical modulation at the optical circuit device 3, in accordance with an input data signal. The driver 6 has an amplifier 6a and a capacitor element 6b (with a capacitance of about 0.1 μF, for example) for capacitor coupling. Reference numeral 7 denotes a DC supply for generating a DC signal which is provided through the DC input terminal 2d. The amplitude of the electrical signal provided by the DC supply 7 can be set at a variable value.

Figure 2A:
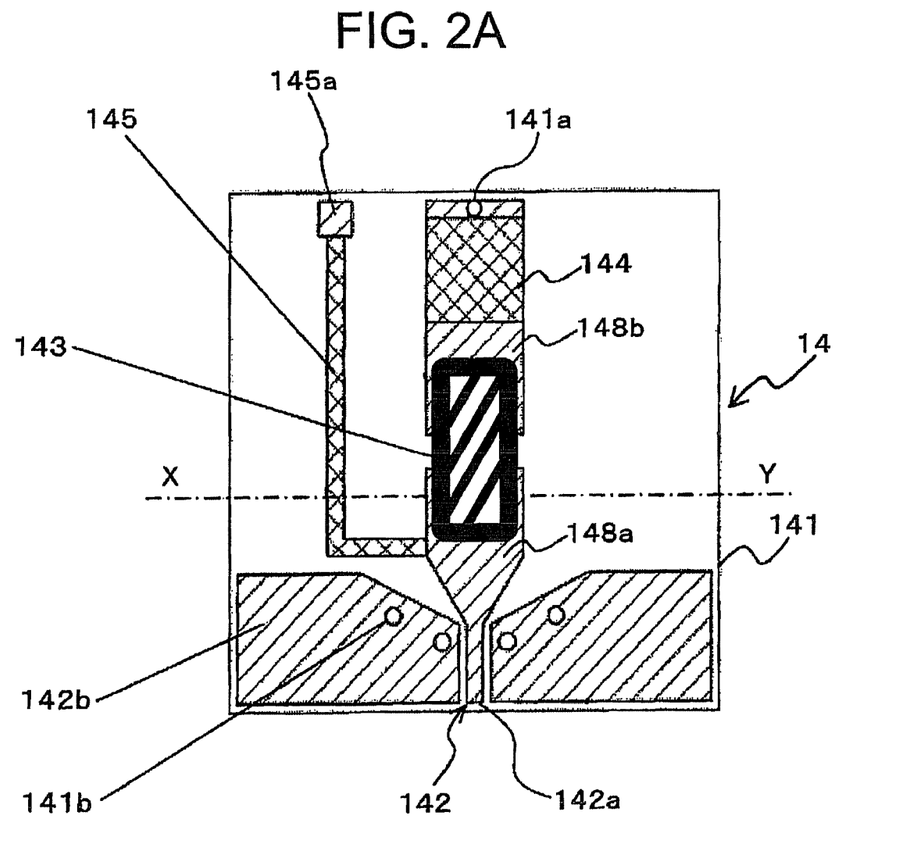
FIG. 2A and FIG. 2B illustrate a comparative example of an electrical circuit device of the embodiment.
Figure 2B:
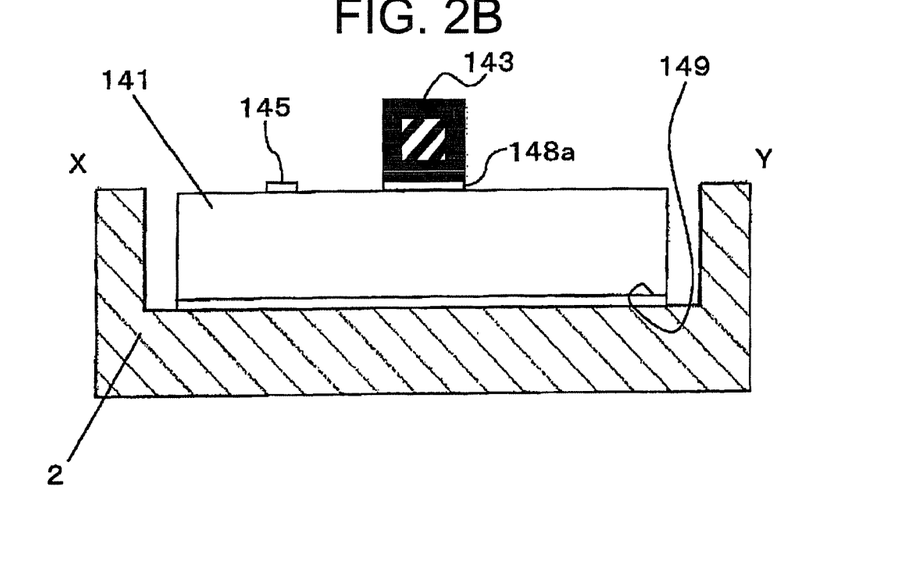
Figure 3A:
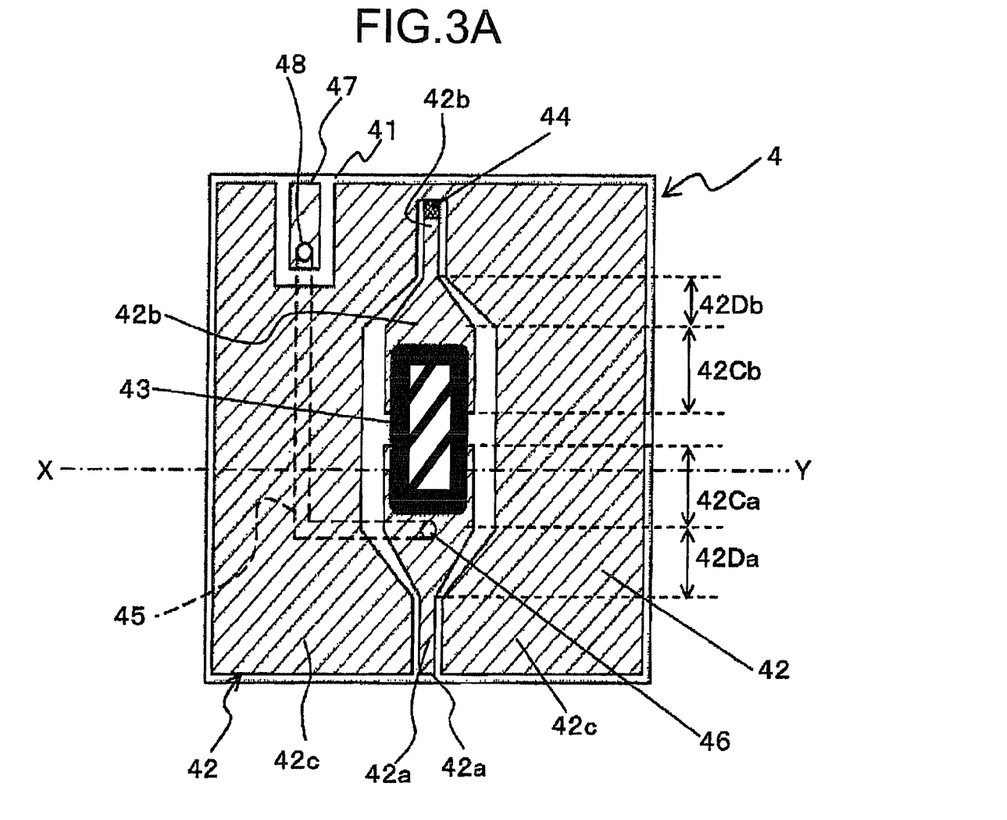
FIG. 3A and FIG. 3B illustrate an electrical circuit device of the embodiment.
Figure 3B:
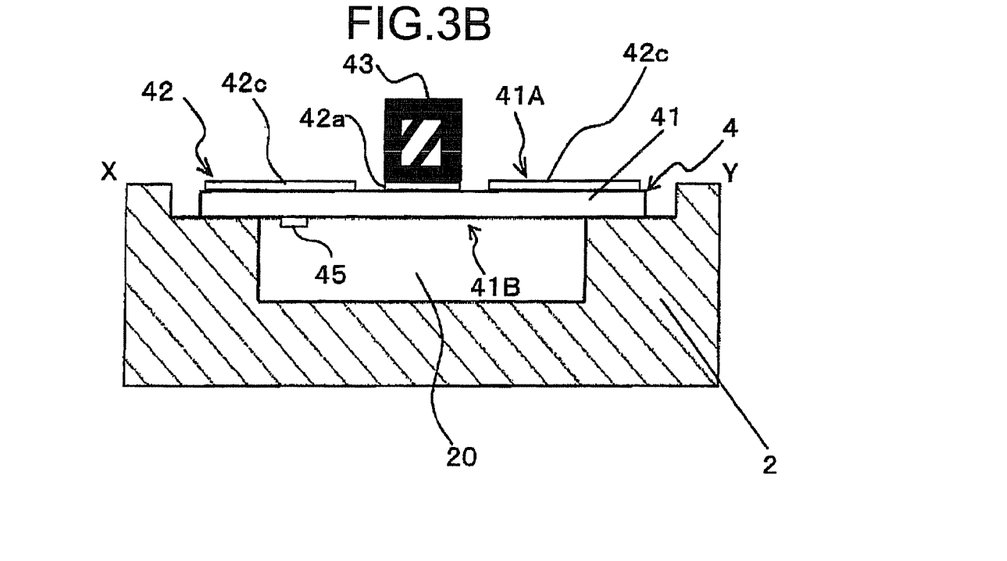

FIG. 2 illustrates an electrical circuit device 14 as a comparative example of the electrical circuit device 4 of the embodiment (see FIG. 3). The electrical circuit device 14 also has an equivalent circuit configuration which is substantially the same as that of FIG. 1. The electrical circuit device 14 terminates an RF electrical signal from the electrical waveguide 3a which constitutes the optical circuit device 3 and provides a bias signal to the electrical waveguide 3a. Here, FIG. 2A is a top view of the electrical circuit device 14 and FIG. 2B is a sectional view taken along the XY of FIG. 2A, which also illustrates how the device is housed in the housing 2.

The electrical circuit device 14 has a dielectric substrate 141 (hereinafter, simply called a substrate in some cases), and a line for terminating an RF electrical signal and a line for supplying a DC bias are formed on the same surface of the substrate 141. The whole back surface may be used as a grounded electrode 149 (see FIG. 2B).

A signal line for terminating an RF electrical signal is provided as follows. One side of the line interfacing with the electrical waveguide 3a of the optical circuit device 3 is formed as a CPW 142 consisting of a signal line 142a and ground electrodes 142b on the substrate 141, and the other side of the line with the termination resistor 144 (see 4b of FIG. 1) is formed as mutually decoupled microstrip lines 148a and 148b. The ground electrodes 142b and the ground electrode 149 are connected by via holes 141b which are appropriately provided in the thickness direction of the substrate 141.

Although the microstrip line 148b is decoupled from the microstrip line 148a, a microchip capacitor 143 is mounted on the decoupled portion. The termination resistor 144 is interposed within the microstrip line 148b and has an impedance which substantially matches the impedance of the electrical waveguide 3a. The downstream end of the microstrip line 148b is connected to the ground electrode 149 formed on the backside of the substrate by a via hole 141a going through the substrate 141 in the thickness direction thereof.

A microstrip line 145, functioning as a line for providing a DC bias, is a resistor (see the resistor 4c of FIG. 1) for superimposing a bias-control DC signal, supplied to the terminal portion 145a, onto the microstrip line 148a. In other words, the line 145 for applying a bias through a resistor extends from a region of the microstrip line 148a.

Thus, a line for terminating an RF electrical signal is formed by using the CPW 142 for the portion of RF electrical signal input from the electrical waveguide 3a, and by changing midway to the microstrip lines 148a and 148b so that a bias applying line is easily formed.

Generally, the capacitor 143 (see the capacitor 4a of FIG. 1) which makes up a bias tee of the termination portion of a communication modulator needs to have a certain amount of capacitance so as to produce a short circuit effect for the entire frequency band of the RF electrical signal. To obtain a short circuit effect for frequencies above or equal to approximately 30 kHz, which is assumed to be the frequency band of the RF electrical signal, a capacitor having a capacitance of, for example, about 0.1 μF is used for the microchip capacitor 143.

However, the microchip capacitor 143 having such a capacitance becomes about 0.6 to 1 mm in size. Therefore, the microstrip lines 148a and 148b need to be also about 0.6 to 1 mm in pattern width. Note that in FIG. 2A, the pattern widths of the microstrip lines 148a and 148b are illustrated as being slightly larger than the width of the microchip capacitor 143 to show the decoupled portions of the microstrip lines 148a and 148b. The thickness of the dielectric substrate 141 is chosen in such a manner that the matching impedance can be obtained by the termination resistor 144 in the frequency band of an RF electrical signal on the basis of the permittivity and width of the substrate 141.

For instance, when alumina ceramic, whose permittivity is a little less than 10, is used for the material of the substrate 141, the thickness of the substrate 141 needs to be about 1 mm in order to form the lines 142, 148a, and 148b having the impedance which matches that of the electrical waveguide 3a.

However, when the substrate 141 having such a thickness is used, the portion where the CPW 142 changes to the microstrip line 148a is likely to cause deterioration of the high-frequency signal characteristics. Further, when the substrate 141 having such a thickness is used, similar to using the substrate 141 having a large size, generation of cavity resonance of the substrate 141 may cause deterioration of the microwave characteristics during propagation of a high-frequency signal through the lines 142, 148a, and 148b.

In cavity resonance, an electromagnetic wave mode is generated at a natural frequency (resonant frequency) determined by the shape and size of the substrate 141. Here, making the substrate 141 thinner or smaller will raise the natural frequency, whereas making the substrate 141 thicker or larger will lower the natural frequency. Generally, the resonant mode frequency f0 within a substrate is given by Equations (1) and (2). Here, d denotes substrate thickness, er denotes relative permittivity, and c0 denotes the speed of light.

[Equation 1]

$$f0 = c0/2nd \quad (1)$$

$$n = \sqrt{er} \quad (2)$$

On the other hand, since there is a tendency that the data bit rate for optical modulation at the optical circuit device 3 increases, the frequency band of an RF electrical signal to be terminated is also expected to include a higher-frequency band. Then the above-described frequency band of the RF electrical signal overlaps with the frequency band of the resonant frequency of the cavity resonance, and therefore, the cavity resonance may hinder the improvement of the characteristics (microwave characteristics) of the RF electrical signal.

Accordingly, in the present embodiment, as illustrated in FIG. 3A and FIG. 3B, it is proposed that coplanar lines 42 functioning as a line to terminate an RF electrical signal are introduced to a first surface 41A of the dielectric substrate 41, and a microstrip line 45 for a bias signal is introduced to a second surface 41B which is a back surface opposite the first surface 41A, thereby making the thickness of the dielectric substrate 41 smaller than in the case of FIG. 2.

In other words, as illustrated in FIG. 3A, the substrate 41 is made to be sufficiently thin by forming all the patterns disposed on the first surface 41A of the substrate 41 to be coplanar patterns, and further, in order to avoid an electrical coupling of the first line 42a which constitutes a signal line and the ground on the second surface 41B, only the peripheral portion of the substrate is fixed to and in contact with the housing 2 thereby providing an air layer 20 on the back side of the substrate as illustrated in FIG. 3B.

Regarding the way of forming a line for applying a bias in this case, a structure is required for forming a line in such a manner as to avoid deterioration of characteristics. In the present embodiment, a microstrip line 45 for forming a bias line is formed on the second surface 41B, utilizing the fact that the air layer 20 provided to suppress cavity resonance separates the second surface 41B of the substrate 41 and the housing 2.

In a wide portion 42Ca of the first line 42a, the line 45 is led from the second surface 41B to the first surface by use of a via hole, as a conducting portion 46, with a sufficiently smaller diameter than the line width of the wide portion 42Ca, thereby making it possible to limit the deterioration of characteristics to a minimum.

FIG. 3 illustrates an example of the electrical circuit device 4 of the present embodiment. FIG. 3A is a top view of the device and FIG. 3B is a sectional view of the device taken along the XY of FIG. 3A, which also illustrates how the device is housed in the housing 2. As illustrated in FIG. 2A, the electrical circuit device 4 is equipped with a dielectric substrate 41 made of alumina ceramic and the like, the coplanar lines 42, a capacitor member 43, a termination resistor 44 (corresponding to 4b of FIG. 1), the microstrip line 45 and the conducting portion 46.

The coplanar line 42, which is formed on the first surface 41A of the dielectric substrate 41, is made up of the first line 42a and the second line 42b which are mutually decoupled, and of a ground electrode 42c which is formed around the first line 42a and the second line 42b sandwiching disconnected portions (gaps).

The capacitor member 43, corresponding to the above-described capacitor 4a in the equivalent circuit of FIG. 1, are mounted in such a manner as to connect the decoupled first line 42a and the second line 42b. The capacitor member 43 is constituted by, for example, a microchip capacitor. Here a capacitor with a diameter of about 0.6 to 1 mm is used to obtain a capacitance of about 0.1 μF.

Here, the decoupled portions of the first line 42a and the second line 42b where the above-described capacitor member 43 is connected are formed in such a manner as to become wider (about 0.6 to 1 mm) than the other portions in accordance with the above-described diameter of the capacitor member 43. In other words, the first line 42a and the second line 42b have, at the decoupled portions, wider portions 42Ca and 42Cb than portions 42a' and 42b' opposite the decoupled portions of the first line 42a and the second line 42b. In FIG. 3A, the widths of the wide portions 42Ca and 42Cb are illustrated as being slightly larger than the width of the capacitor 43 to show the above-described decoupled portions.

Reference numerals 42Da and 42Db denote tapered portions whose widths continuously change as going from the end portion 42a' of the first line 42a and the end portion 42b' of the second line 42b, opposite the decoupled portions, to the wide portions 42Ca and 42Cb, respectively. Likewise, the widths of the gaps between the ground electrode 42c and both sides of the first line 42a and the second line 42b are given the widths based on the widths of the corresponding portions of the first line 42a and the second line 42b.

Thus, the decoupled portions of the first line 42a and the second line 42b are arranged to have widths corresponding to the diameter of the capacitor member 43. When a capacitor with a smaller diameter than the above-described capacitor, which satisfies the requirement for the frequency characteristics as the capacitor member 43, can be mounted, the lines 42a and 42b may be appropriately arranged to have uniform widths.

Here, the electrical waveguide 3b of the optical circuit device 3 and the end portion 42a' of the first line 42a among the coplanar lines 42 are connected with wire bonding or the like. Therefore, the RF electrical signal which propagates through the electrical waveguide 3b propagates through the first line 42a, the capacitor member 43, and the second line 42b.

The termination resistor 44 is formed, for example, as a thin-film resistor connecting the second line 42b and the ground electrode 42c. The termination resistor 44, which corresponds to the termination resistor 4b of the above-described equivalent circuit (see FIG. 1), terminates the RF electrical signal which has propagated from the electrical waveguide 3b through the coplanar lines 42 as described above. The impedance of the termination resistor 44 matches that of the electrical waveguide 3b.

The microstrip line 45 is formed on the second surface of the dielectric substrate 41, which is the back surface opposite the first surface 41A. Further, the conducting portion 46 which is formed within the dielectric substrate 41 causes the first line 42a and the microstrip line 45 to conduct, and is exemplified by a via hole which causes the line 42a on the first surface and the line 45 on the second surface of the dielectric substrate 41 to be electrically connected and to conduct in the thickness direction of the dielectric substrate 41.

In other words, the microstrip line 45 can propagate a DC electrical signal supplied from the DC input terminal 2d (see FIG. 1) and provide the DC signal to the electrical waveguide 3a as a bias signal through the via hole, which is the conducting portion 46, and the first line 42a. This means that the microstrip line 45 corresponds to the resistor 4c of the above-described equivalent circuit illustrated in FIG. 1 and has an impedance which corresponds to that of the resistor 4c.

Regarding the place where the conducting portion 46 is formed, by disposing the conducting portion 46 at a place in the first line 42a where an electrical influence from the ground electrode 42c is relatively small, deterioration of the characteristics of the bias signal propagating through the bias signal line 4B (see FIG. 1) can be suppressed. More specifically, the conducting portion 46 is disposed at a position in the wide portion 42Ca making up the first line 42a which is farthest from the ground electrode 42c. Further, by making the conducting portion 46 be a conducting line extending in the thickness direction of the dielectric substrate 41 using a via hole whose diameter is sufficiently smaller than the width of the line at the wide portion 42Ca, an electric coupling with the ground electrode 42c can be limited to a minimum, and the deterioration of characteristics can be limited to a minimum.

As for the structure of the connection between the input terminal 2d and the microstrip line 45, a direct connection employing wire bonding and the like may be used. Alternatively, from the viewpoint of the convenience of wiring among others, by forming an electrode 47 on the first surface 41A as illustrated in FIG. 3A and connecting the electrode 47 to the DC input terminal 2d, a DC electrical signal may be propagated through the electrode 47 to the microstrip line 45. In the example of FIG. 2A, the electrode 47 and the microstrip line 45 are electrically connected and conduct through the via hole 48 formed within the dielectric substrate 41.

Further, the housing 2 houses the electrical circuit device 4 together with the optical circuit device 1 (see FIG. 1) described above, as illustrated in FIG. 3B. Here, all the patterns of the electrical circuit device 4 on the first surface 41A are formed as coplanar patterns, allowing the substrate 41 to be sufficiently thin, whereby generation of cavity resonance is suppressed while an impedance required for the termination of an RF electrical signal is ensured.

In addition, to avoid electrical coupling between the first line 42a making up the signal line and the ground potential of the housing 2, only the peripheral portion of the substrate is fixed to and in contact with the housing 2, while providing the air layer 20 on the back side of the substrate as illustrated in FIG. 3B. In other words, the air layer 20 has sufficient size for substantially removing the electrical influence of the housing 2 on the electrical circuit device 4. Thus, the microwave characteristics of the electrical circuit device 4 are further improved.

In the circuit device apparatus configured as described above, the electrical circuit device 4 terminates an RF electrical signal propagating through the electrical waveguide 3a of the optical circuit device 3, and a DC signal functioning as the bias signal is provided to the electrical waveguide 3a via the electrical circuit device 4.

Here, since an element with a relatively large diameter needs to be used as the capacitor member 43, the lines 42a and 42b with a large width are formed. However, since the coplanar lines 42 are formed for propagating an RF electrical signal and the microstrip line 45 is formed on the second surface 41B for propagating a bias signal, the dielectric substrate 41 need not have a thickness corresponding to the line widths of the wide portions 42Ca and 42Cb. Therefore, the thickness of the dielectric substrate 41 can be reduced from about 1 mm to about, for example, 0.5 mm in the present embodiment.

Figure 4:
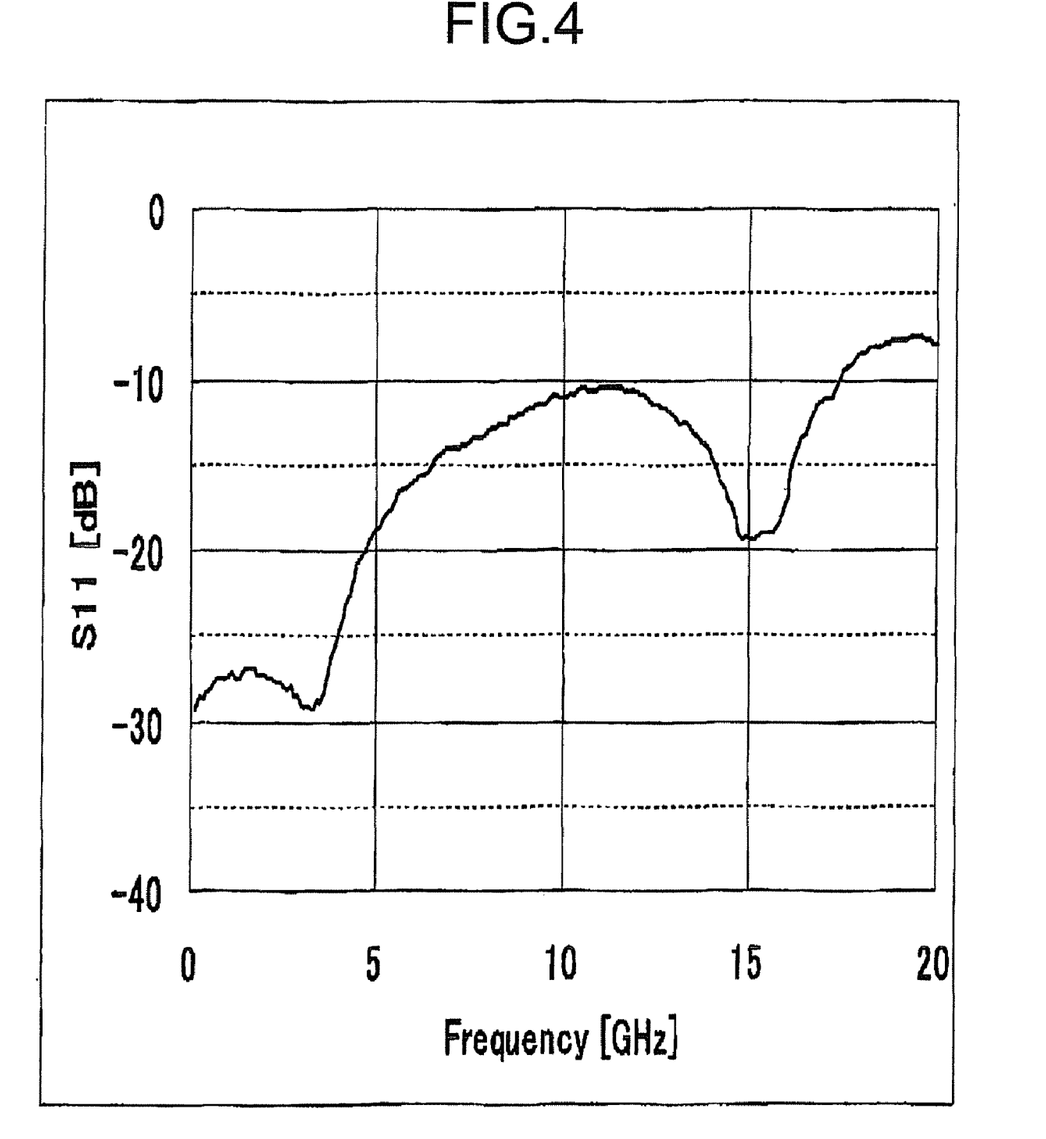
FIG. 4 illustrates an example of microwave characteristics of the electrical circuit device illustrated in FIG. 2.
Figure 5:
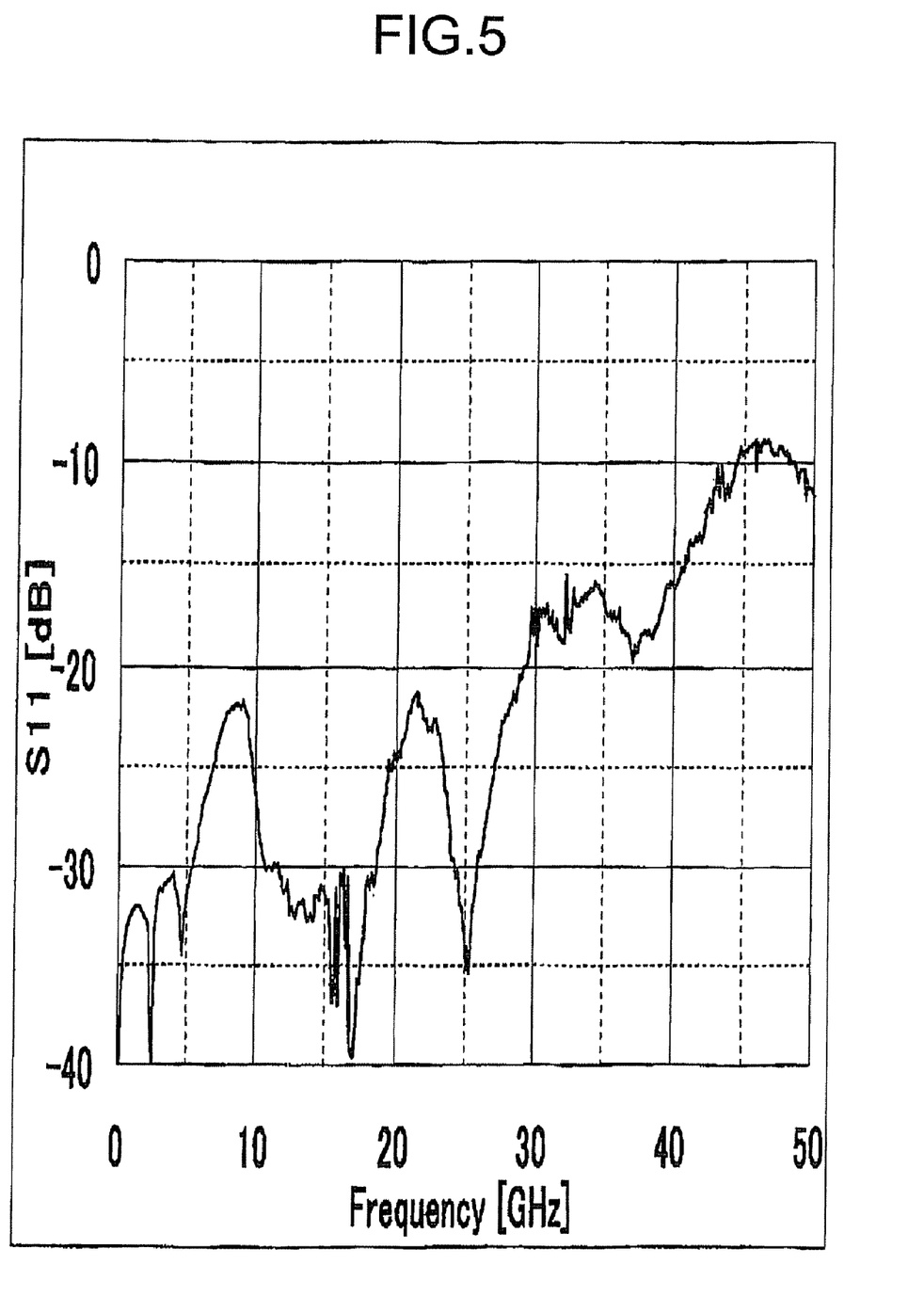
FIG. 5 illustrates an example of microwave characteristics of the electrical circuit device illustrated in FIG. 3.

FIG. 5 illustrates the microwave characteristics, S11 characteristics, of the electrical circuit device 4 of the embodiment illustrated in FIG. 3, and FIG. 4 illustrates the S11 characteristics of the electrical circuit device 14 as a comparative configuration example illustrated in FIG. 2. As illustrated in FIGS. 4 and 5, it is understood that in the electrical circuit device 4 of the present embodiment illustrated in FIG. 3, deterioration is greatly reduced in a wide frequency band (at least for frequencies below or equal to 20 GHz) which is assumed to be covered by an RF electrical signal, compared with the S11 characteristics of the electrical circuit device 14 illustrated in FIG. 2.

Accordingly, the present embodiment provides the advantage that favorable microwave characteristics are obtained in a wider band of frequency.

The following appendix is further disclosed regarding the embodiment described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A circuit device comprising:
   an optical circuit including an optical substrate having an electro-optical effect, the optical substrate including an optical wave guide and a progressive wave electrode; and
   an electrical circuit including:
      a dielectric substrate including a first face and a second face opposite side of the first face;
      a coplanar line including a first line, a second line and ground electrodes, the first line and the second line being decoupled mutually, the ground electrodes being formed around the first line and the second line, the first line, the second line and the ground electrodes being formed on the first face of the dielectric substrate;
      a capacitor for connecting the first line and the second line;
      a termination resistor connecting the second line;
      a microstrip line formed on the second face of the dielectric substrate; and
      a conducting portion formed in the dielectric substrate and electrically connecting the first line and the microstrip line,
   wherein the first line is coupled to the progressive wave electrode for terminating a signal for modulating an optical signal that propagates through the optical wave guide and for providing a DC bias signal.

2. The circuit device of claim 1, wherein the first line and the second line have an end portion and a wide portion being wider than the end portion, respectively, the wide portions facing each other at a decoupled portion of the first line and second line.

3. The circuit device of claim 2, wherein the first line and the second line have a tapered portion between the end portion and the wide portion, respectively, the tapered portion having a width continuously changing.

4. The circuit device of claim 3, wherein the wide portion has a line width on which the capacitor is able to be mounted.

5. The circuit device of claim 3, wherein the conducting portion is a via hole being formed in the substrate and between the first line and the microstrip line.

6. The circuit device of claim 1, wherein the conducting portion is arranged at a portion of the first line having small electrical influence from the ground electrode.

7. The circuit device of claim 1, further comprising an electrode being electrically connected to the microstrip line via a conductor arranged between the first face and second face, the conductor arranged at different portion of the conducting portion.

8. The circuit device of claim 7, wherein the first line is provided a signal and the electrode is provided a DC bias signal.

9. The circuit device of claim 1, wherein the dielectric substrate has a thickness less or equal approximately 500 μm.

10. The circuit device of claim 1, further comprising a housing accommodating the optical circuit and the dielectric substrate.

11. The circuit device of claim 10, wherein the housing has an air layer to the dielectric substrate side, the air layer having a size being approximately unaffected electrical influence with respect to the dielectric substrate.

12. The circuit device of claim 1, wherein the termination resistor has an impedance amount for matching with the progressive wave electrode.

* * * * *

UNITED STATES PATENT AND TRADEMARK OFFICE
CERTIFICATE OF CORRECTION

| | | |
|---|---|---|
| PATENT NO. | : 8,120,925 B2 | |
| APPLICATION NO. | : 12/407867 | |
| DATED | : February 21, 2012 | |
| INVENTOR(S) | : Takehito Tanaka | |

It is certified that error appears in the above-identified patent and that said Letters Patent is hereby corrected as shown below:

On the Title Page, Item (57) (Abstract), Line 4, Delete "decupled" and insert -- decoupled --, therefor.

Signed and Sealed this
Eighth Day of May, 2012

David J. Kappos
*Director of the United States Patent and Trademark Office*